United States Patent
Sandel et al.

(12) 
(10) Patent No.: US 6,665,391 B2
(45) Date of Patent: Dec. 16, 2003

(54) AUDITING OF CHARGES IN AN INTEGRATED PREVALIDATION AND ORDERING SYSTEM

(75) Inventors: David R. Sandel, Colorado Springs, CO (US); Manoj V. Paul, Colorado Springs, CO (US)

(73) Assignee: WorldCom, Inc., Jackson, MS (US)

( * ) Notice: Subject to any disclaimer, the term of this patent is extended or adjusted under 35 U.S.C. 154(b) by 255 days.

(21) Appl. No.: 09/776,785

(22) Filed: Feb. 5, 2001

(65) Prior Publication Data

US 2002/0106067 A1 Aug. 8, 2002

(51) Int. Cl.⁷ .............................. H04M 3/42; H04M 7/00
(52) U.S. Cl. .............................. 379/201.12; 379/201.05; 379/219
(58) Field of Search ................... 379/201.12, 219, 379/220.01, 229, 201.02, 201.03, 201.05

(56) References Cited

U.S. PATENT DOCUMENTS

| | | | | |
|---|---|---|---|---|
| 5,416,833 A | * | 5/1995 | Harper et al. | 379/201.05 |
| 5,491,742 A | * | 2/1996 | Harper et al. | 379/201.12 |
| 5,644,619 A | * | 7/1997 | Farris et al. | 379/29.01 |
| 5,881,131 A | * | 3/1999 | Farris et al. | 379/15.03 |
| 5,937,048 A | * | 8/1999 | Pelle | 379/201.12 |
| 6,104,798 A | * | 8/2000 | Lickiss et al. | 379/201.12 |

\* cited by examiner

*Primary Examiner*—Harry S. Hong

(57) ABSTRACT

Disclosed is a system that prevalidates service orders that are placed by an inter exchange carrier with a local exchange carrier for connection of the inter exchange carrier with a business customer. An integrated prevalidation system and service order system is disclosed in which prevalidation requests are performed using the data that is entered for the service order. Prevalidation responses are then used to ensure that the order will be correct when submitted, thereby avoiding the necessity for expensive supplemental orders. Further, the present invention allows for stand alone prevalidation requests which enable a provisioner to determine availability of circuits, and to determine location information and equipment identification directly from the LEC databases. Further, the present invention is capable of reconciling the database of the inter exchange carrier with the database of the LEC to avoid submission of incorrect service orders. Further, auditing reports can be generated whenever a prevalidation response has been accepted and a service order acknowledgment has rejected the service order. These reports can be used to audit and obtain credit for the necessary supplemental orders which may follow. Also, prevalidation requests are reserved to prevent submission of conflicting service orders.

13 Claims, 12 Drawing Sheets

Rapid Access Validation Engine

CFA Inquiry | Location Inquiry | Service Inquiry

LEC: SBC ▼ — 110

CFA Inquiry Input — 112
Fac Desg: ____   Fac Type: ____
Loc A: ____   Loc Z: ____   Clear

PrePopulate Option — 114
Netpro Circuit: ____   Netpro Order: ____

Channel: ____   Select All

| Circuit | Location | Leg | CFA |
|---|---|---|---|

— 118

Output Choices

| Status | LecID | Date | ID | CFA |
|---|---|---|---|---|
| Gateway Sent | Sbc | 10/27/1999 @ 09:59 AM | 10739 | 9504/T1/LTRKARFRHA2/LTRKARFRK06/ |
| Reply Seen | Sbc | 10/27/1999 @ 09:58 AM | 10732 | 9504/T1/LTRKARFRHA2/LTRKARFRK06/2 |
| Reply Seen | Sbc | 10/15/1999 @ 10:42 AM | 10727 | 9504/T1/LTRKARFRHA2/LTRKARFRK06/ |
| Reply Seen | Sbc | 10/15/1999 @ 10:42 AM | 10726 | 9504/T1/LTRKARFRHA2/LTRKARFRK06/ |
| Reply Seen | Sbc | 10/15/1999 @ 10:42 AM | 10725 | 9504/T1/LTRKARFRHA2/LTRKARFRK06/ |
| Reply Seen | Sbc | 10/15/1999 @ 10:42 AM | 10724 | 9504/T1/LTRKARFRHA2/LTRKARFRK06/ |
| Reply Seen | Sbc | 10/15/1999 @ 10:42 AM | 10723 | 9504/T1/LTRKARFRHA2/LTRKARFRK06/ |
| Reply Seen | Sbc | 10/15/1999 @ 10:42 AM | 10722 | 9504/T1/LTRKARFRHA2/LTRKARFRK06/ |

116

Send   Edit

Rapid Access Validation Engine

CFA Inquiry | Location Inquiry | Service Inquiry

LIT: Descriptive Address ▼ —126   LEC: SBC ▼ —128

Customer Premise Address
Number: [ ]          Street Direction: [ ]
Co. Name: [ST LOUIS UNION STATION]   Street Type: [ ]
City: [ ]            State/Prov.: [MO]
Postal Code: [63103]  Country: [ ]
Building: [ ]        Floor: [ ]       Room: [ ]    —130

[Clear]

ECCKT Information —132    Location Code Information —134
ECCKT: [ ]                 Location Code: [ ]

Output Choices —138

| Status | LecId | Date | ID | Data Sent |
|---|---|---|---|---|
| Reply Seen | Pac | 10/15/1999@08:50 AM | 10464 | DLLSTXBAWMG |
| Reply Seen | Sbc | 10/15/1999@08:49 AM | 10463 | ST LOUIS UNION STATION, MO 63103 |
| Reply Complete | Sbc | 10/14/1999@02:51 PM | 10428 | ST LOUIS UNION STATION, MO 63103 |
| Reply Complete | Pac | 10/14/1999@02:51 PM | 10427 | DLLSTXBAWMG |
| Reply Seen | Pac | 10/08/1999@09:24 AM | 10351 | DLLSTXBAWMG |
| Reply Seen | Sbc | 10/07/1999@04:59 PM | 10349 | ST LOUIS UNION STATION, MO 63103 |
| Reply Seen | Sbc | 10/07/1999@04:58 PM | 10348 | ST LOUIS UNION STATION, MO 63103 |
| Reply Seen | Sbc | 10/07/1999@04:57 PM | 10345 | ST LOUIS UNION STATION, MO 63103 |
| Error | Sbc | 10/07/1999@03:24 PM | 10341 | DLLSTXBAWMG |
| Error | Pac | 10/07/1999@03:23 PM | 10338 | DLLSTXBAWMG |
| Reply Seen | Sbc | 10/07/1999@03:23 PM | 10337 | ST LOUIS UNION STATION, MO 63103 |
| Reply Complete | Pac | 08/31/1999@04:19 PM | 10317 | DLLSTXBAWMG |
| Reply Complete | Sbc | 08/31/1999@04:01 PM | 10316 | ST LOUIS UNION STATION, MO 63103 |
| Reply Complete | Pac | 08/31/1999@04:01 PM | 10315 | DLLSTXBAWMG |
| Reply Seen | Sbc | 08/31/1999@04:00 PM | 10314 | ST LOUIS UNION STATION, MO 63103 |

—140              136—  [Send]   [Edit]

FIG. 7

Rapid Access Validation Engine

CFA Inquiry | Location Inquiry ST LOUIS UNION STATION, MO 63103 | Service Inquiry

LIT: Numbered    ID: 10740    IRI: Alternatives Exist    LEC: Sbc

Customer Premise Address Input
Address: ST LOUIS UNION STATION MO 63103

Customer Premise Address Output — 144

| Street/Name | Floor | Room | Bldg | City | State | Postal Code | LSO | SWC |
|---|---|---|---|---|---|---|---|---|
| 1820 MARKET | 2ND | UNIT 215 | | ST LOUIS | MO | 63103 | 314241 | |
| 1820 MARKET | | UNIT 100 | | ST LOUIS | MO | 63103 | | |

IRM
ST LOUIS UNION STATION

220 CFAs {
- H/PSWB/1999-07-22
- C/9501/T1//JNBOARMAK03/JNBOAR10W02
- C/9532/T1//LTRKARFRHA2/LTRKARFRK06 — 222 CFA
- C/9504/T1//LTRKARFRHA2/LTRKARFRK06
- C/9528/T1//LTRKARFR/LTRKARFRHA2
- C/9533/T1//LTRKARFRHA2/LTRKARFRK06
- C/9506/T1//FYVLARAFWCC/FYVLARHIK06
- C/9535/T1//LTRKARFRHA2/LTRKARFRK06 — 226 CFA
- C/9513/T1ZF//LTRKARFRHA2/LTRKARFRK06
- C/9512/T1ZF//LTRKARFRHA2/LTRKARFRK06
- C/9503/T1//FYVLARAFWCC/FYVLARHI

FIG. 11

```
H/PSWB/20000103                         222 CFA
C/9532/T1//LTRKARFRHA2/LTRKARFRK06
I/A
R/63/XGGS/023283        /SW             01 A  ⎫
R/63/XHGS/029132        /SW             02 A  ⎪
R/63/XHGS/027206        /SW             03 A  ⎪
R/                      0406S                 ⎪
R/63/XHGS/027203        /SW             07 A  ⎪
R/                      08  S                 ⎪
R/02/XHGS/100043        /GTEC           09 A  ⎪
R/63/XHGS/030085        /SW             10 A  ⎪
R/63/XHGS/030088        /SW             11 A  ⎪
R/63/XHGS/023826        /SW             12 A  ⎪
R/63/XHGS/022787        /SW             13 A  ⎬ 224 Responses
R/                      14  S                 ⎪
R/63/XHGS/025089        /SW             15 A  ⎪
R/                      16  S                 ⎪
R/63/XHGS/028713        /SW             17 A  ⎪
R/63/XGGS/029563        /SW             18 A  ⎪
R/63/XHGS/025241        /SW             19 A  ⎪
R/63/XHGS/024145        /SW             20 A  ⎪
R/                      2122S                 ⎪
R/63/XHGS/030078        /SW             23 A  ⎪
R/                      24  S                 ⎭
C/9535/T1//LTRKARFRHA2/LTRKARFRK06
I/A                                           226
R/63/XGGS/023575        /SW             01 A  ⎫
R/                      02  S                 ⎪
R/63/XHGS/022979        /SW             03 A  ⎪
R/63/XGGS/032683        /SW             04 A  ⎪
R/63/XHGS/029881        /SW             05 A  ⎪
R/63/LGGS/021698        /SW             06 A  ⎪
R/63/XHGS/031468        /SW             07 A  ⎪
R/                      08  R                 ⎪
R/63/XGGS/031406        /SW             09 A  ⎬ 228 Responses
R/63/XHGS/028962        /SW             10 A  ⎪
R/                      11  S                 ⎪
R/02/LGGS/200028        /GTEC           12 A  ⎪
R/63/XHGS/023783        /SW             13 A  ⎪
R/63/XHGS/029918        /SW             14 A  ⎪
R/63/XHGS/029949        /SW             15 A  ⎪
R/63/XHGS/022329        /SW             16 A  ⎪
R/63/XHGS/022350        /SW             17 A  ⎪
R/63/LGGS/022790        /SW             18 A  ⎪
R/63/XGGS/030802        /SW             19 A  ⎭
```

FIG. 12

AUDITING OF CHARGES IN AN INTEGRATED PREVALIDATION AND ORDERING SYSTEM

FIELD OF THE INVENTION

The present invention pertains generally to telecommunications and, more particularly, to a system for prevalidating orders with a local exchange carrier.

BACKGROUND OF THE INVENTION

Inter exchange carriers, such as MCI, that provide long-distance service to customers, frequently place access service requests with local exchange carriers to establish voice and data connections. Hence, the inter exchange carriers, such as MCI, have to deal with a number of different local exchange carriers that provide the local service for these customers. Typically, the local exchange carrier will make certain services available to business customers within the LEC's service area. For example, a LEC may provide a certain number of T1, T3, OC-48, etc. services that are provided between the customer and the LEC central office.

The business customer may wish to either activate or deactivate its voice and data services as business needs either increase or decrease, respectively. For example, if a business customer desires to increase its service, a representative of the business customer will normally contact its inter exchange carrier by phone and make a request for the additional service. The provisioner (order taker) located at the inter exchange carrier takes the request from the business customer. The provisioner then processes the request on a prevalidation system. The prevalidation system allows the inter exchange carrier to access the database of the applicable LEC to determine the availability of channels for the requested service. In other words, the prevalidation system obtains the circuit identification for the channels that are to be provided by the LEC to fulfill the service order.

Upon receiving this information from the LEC database, the provisioner then enters access service requests (ASRs) using a separate ordering system. The provisioner performs this task by keyboarding all of the detailed information regarding circuit ID's, service locations, service requests and other detailed information into an ASR ordering system. In the process of performing this task, errors can be easily made by the provisioner. Further, other provisioners of the inter exchange carrier may have also received requests from other representatives of the same business customer at approximately the same time which could result in the duplicate assignment of the same circuit IDs. However, the primary concerns of the inter exchange carrier are that this type of dual system of prevalidation and rekeying of data into an automatic service request system are (1) the time delay in placing the order, and
(2) the costs and delays associated with the necessity to generate supplemental orders whenever the LEC rejects the service request.

A great deal of effort must be expended in entering the detailed and extensive information of an automatic service request. Very often, the provisioners become very busy and are unable to prepare the service request immediately after it is requested by the business customer. Further, the inherent delays in placing an incorrect order, having that order rejected and preparing a supplemental order can be costly to the inter exchange carrier. Such a process of submitting a supplemental order may result in several days of delay. Additionally, it costs the LEC time and money for the provisioner to prepare and submit the supplemental order.

Although prevalidation systems have been very effective in reducing the costs associated with submitting supplemental orders as a result of mistakes in service orders, it would be advantageous to provide a system that further eliminates errors that can occur in the actual ordering process and to provide an integrated system that can automatically prevalidate orders as part of the process of placing an order.

Further, it would be advantageous to provide a system that is capable of generating reports that are useful in analyzing errors that have been made by the LEC. For example, in an integrated system that automatically prevalidates orders as part of the process for placing an order, a rejected acknowledgment may be received from the LEC. Since the service order was prevalidated just prior to placing the order, a rejected acknowledgment should not have been received. It would therefore be advantageous to generate reports that audit these types of error produced by the LEC so that credit can be obtained for charges on supplemental orders that are necessitated by the rejected order acknowledgment.

SUMMARY OF THE INVENTION

The present invention overcomes the disadvantages and limitations of the prior art by providing a system that is capable of generating reports indicating errors made by the LEC and that may be used for auditing LEC charges.

The present invention may therefore comprise a method of auditing an integrated prevalidation and ordering system in which service orders are placed by an inter exchange carrier with local exchange carrier comprising: obtaining prevalidation responses and service order acknowledgments in response to generation of a service order on the integrated revalidation and ordering system; generating a file of the prevalidation responses and service order acknowledgments for each service order that has a rejected acknowledgment and an accepted prevalidation response; using said file to audit charges incurred by the inter exchange carrier for the service orders.

The present invention may further comprise a system for auditing charges incurred by an inter exchange carrier for supplemental orders necessitated by rejected acknowledgments of a service order that received an accepted prevalidation response in an integrated prevalidation and order system comprising: a prevalidation system that generates prevalidation requests and receives prevalidation responses in response to preparation of a service order in an integrated prevalidation and ordering system; an ordering system connected to the prevalidation system and a local exchange carrier that generates a file of accepted prevalidation responses and rejected service order acknowledgments, and generates a report from the file to audit the charges incurred by the inter exchange carrier.

The advantages of the present system are that prevalidation requests can be made automatically as part of an ordering system since the prevalidation ordering system and the ordering system are integrated into a single system that utilizes at least a portion of the same data. In this fashion, the need to reenter data into the ordering system that has already been entered into the prevalidation system is eliminated. Errors that can potentially occur upon reentering data are avoided. Further, delays and costs associated with preparation and submittal of supplemental orders can be substantially eliminated.

BRIEF DESCRIPTION OF THE DRAWINGS

FIG. 4 is a screen printout of a CFA inquiry.

FIG. 6 is a screen printout of a location inquiry.

FIG. 7 is a screen printout of a response of location inquire.

FIG. 8 is a screen printout of a service inquiry.

FIG. 9 is a screen printout of a response to service inquiry.

FIG. 11 is an ASCII file of CFA prevalidation requests.

FIG. 12 is an ASCII file of responses to CFA prevalidation requests.

DETAILED DESCRIPTION OF THE PREFERRED EMBODIMENT

Figure 1:
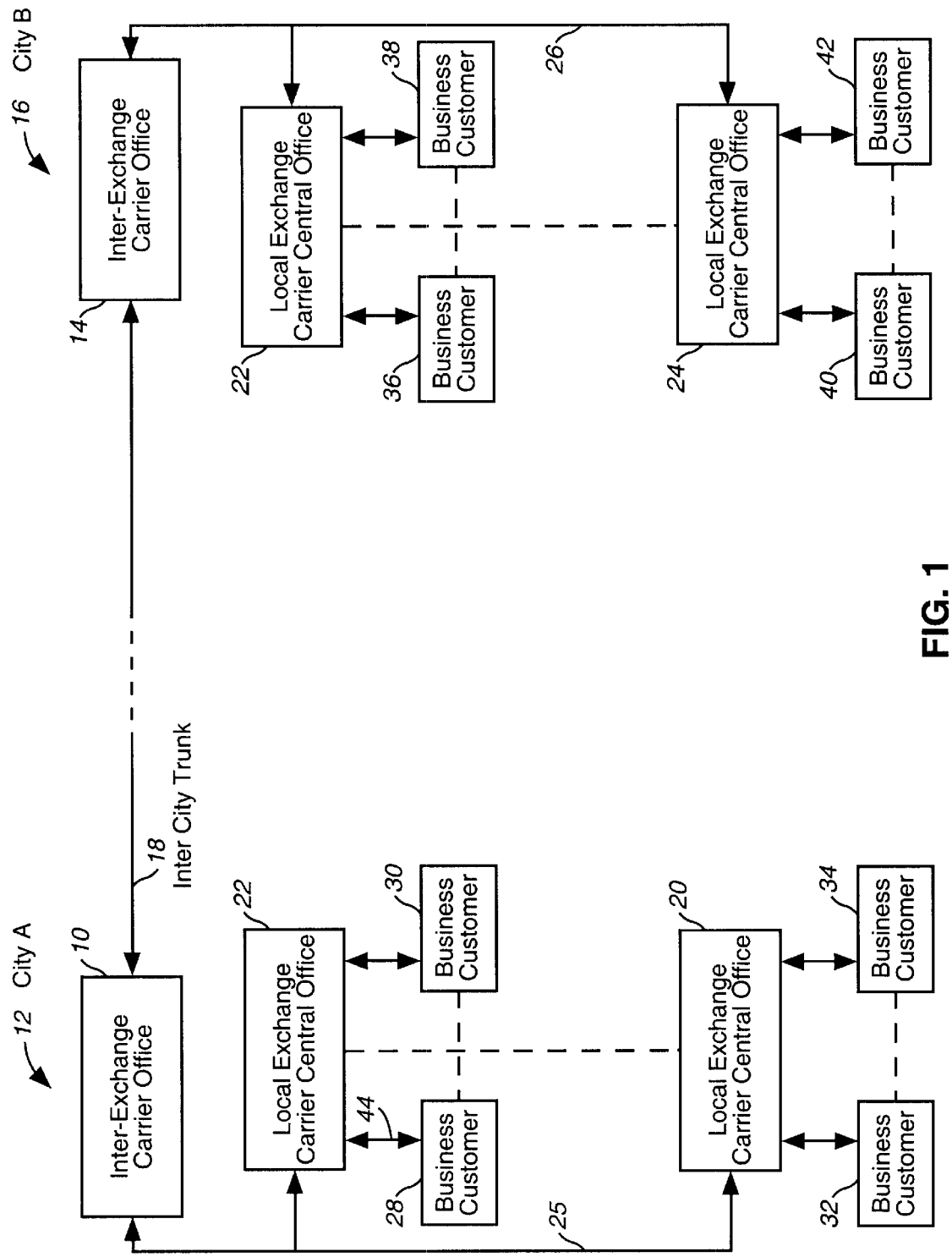
FIG. 1 is a schematic diagram illustrating the relationship of inter exchange carrier offices with local exchange carrier central offices and business customers in two different cities.

FIG. 1 is a schematic illustration of the manner in which an inter exchange carrier is connected to provide long distance data and voice services to business customers through local exchange carriers (LECs). As shown in FIG. 1, an inter exchange carrier has an inter exchange office 10 that is located in city A that is indicated by reference numeral 12. The inter exchange office 10 is connected to an inter exchange office 14, located in city B that is indicated by reference numeral 16, by way of an intercity trunk 18. Intercity trunk 18 may constitute a fiberoptic trunk, a microwave link or other communication links.

As also indicated in FIG. 1, the inter exchange carrier office 10 is connected via the high speed connections 25 to a series of local exchange carrier central offices 18, 20 in city A. Similarly, the inter exchange carrier office 14, that is located in city B, is connected to one or more local exchange carrier central offices 22, 24 via the high speed connections 26. Each of the local exchange carrier central offices is connected to a number of business customers. For example, the LEC CO 18 is connected to business customers 28, 30. LEC CO 20 is connected to business customers 30, 34, LEC CO 22 is connected to business customers 36, 38, and LEC CO 24 is connected to business customers 40, 42.

As can be seen from FIG. 1, for a business customer, such as business customer 28 to obtain the high speed data services offered by the inter exchange carrier, the local exchange carrier central office 18 must provide a connection to the inter exchange carrier office 10. Typically, the business customer 28 calls the inter exchange carrier and asks to have those services provided. The inter exchange carrier then contacts the local exchange carrier to provide the proper connections 44 from the business customer 28 through the central office 18 to the inter exchange carrier. These requests by the inter exchange carrier of the local exchange carrier are referred to as access service requests (ASR). The present invention allows the inter exchange carrier to query the backend systems of the local exchange carrier in realtime to obtain information relevant to (1) location, (2) service availability, and (3) connecting facility assignment (CFA).

Figure 2:
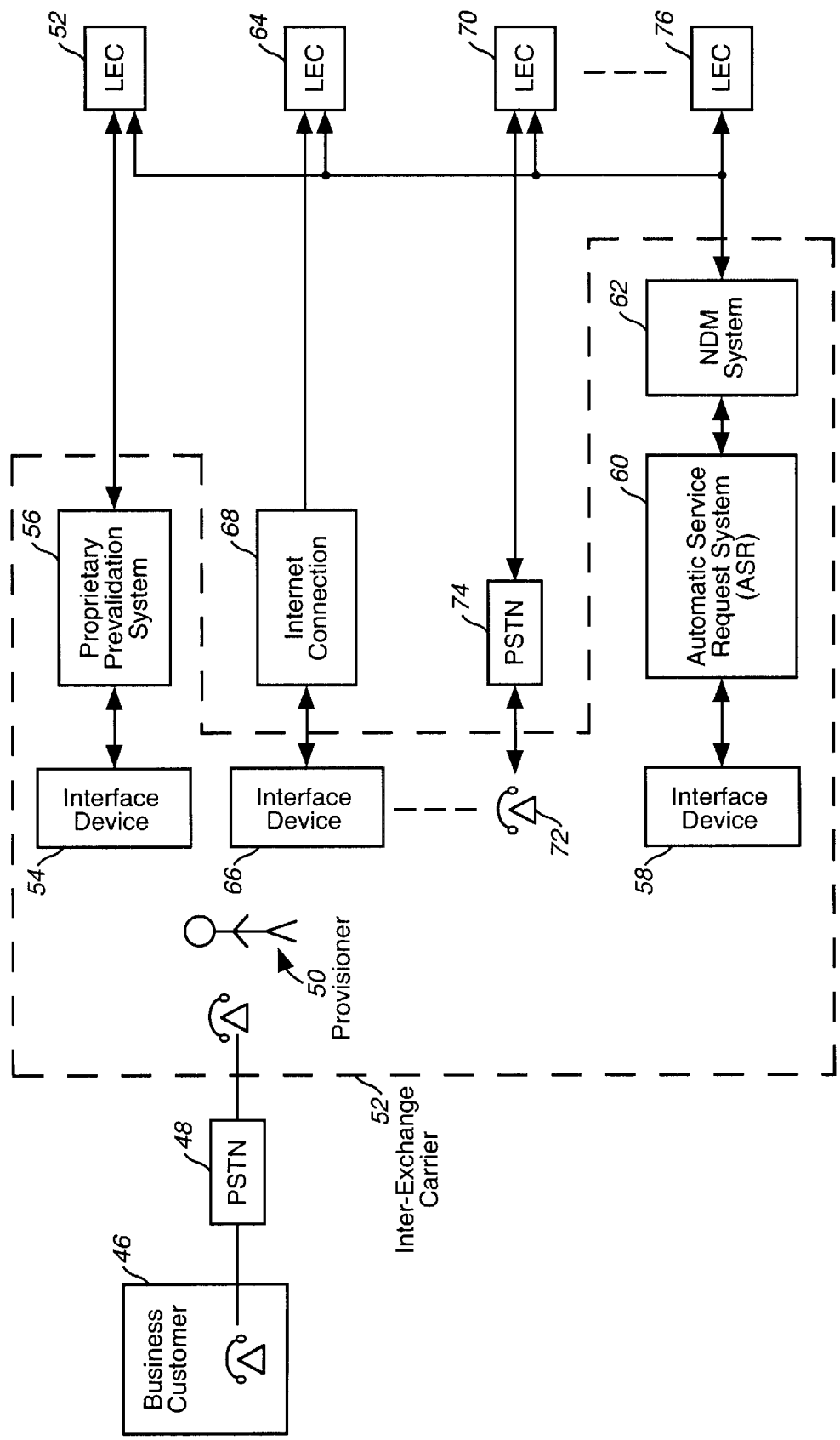
FIG. 2 is a schematic block diagram of the separate systems used for prevalidation and ordering.

FIG. 2 is a schematic illustration of a typical system that is currently in use but does not employ the aspects of the present invention. As shown in FIG. 2, a business customer 46 places a standard telephone call through the public switched telephone network 48 to a provisioner 50 that is employed by the inter exchange carrier 52. The business customer 46 may request services such as additional T1 services, T3 services, etc. The provisioner 50 then determines which LEC provides service to the business customer 46. Provisioner 50 then accesses an interface device, such as interface devices 54, 66, or 72 for obtaining a prevalidation of the requested service. For example, business customer 46 may be connected to LEC 52. In that case, the provisioner 50 would access an interface device 54 that is connected to a proprietary prevalidation system 56. For example, the proprietary prevalidation system 56 provides access to a log-in screen on a mainframe, operated by LEC 52 via the interface device 54 to obtain access to certain prevalidation information. That information can then be used by the provisioner 50 to be entered in the interface device 58 that is provided to the automatic service request system 60 and the network data mover (NDM) ordering system 62 to order the services from LEC 52.

Other LECs, such as LEC 64, may have a password protected Internet web page that the inter exchange carrier 52 can access. For example, provisioner 50 may utilize the interface device 66 to provide an Internet connection 68 to a password protected web page provided by LEC 64. The password protected web page may provide certain information that can be used by the provisioner 50 to place an order through the ASR System 60 by separately entering that data in the interface device 58.

Further, some LECs, such as LEC 70, merely provide information by phone. The provisioner 50 must place a telephone call on telephone 72 through the public switched telephone network 74 to the LEC 70 to obtain provisioning information that can then be used by the provisioner 50 to enter into the interface device 58. Also, some LECs, such as LEC 76, may have no process available for obtaining provisioning information.

As also shown in FIG. 2, the process of actually placing an order through a particular LEC is performed by the provisioner 50 by entering data into the interface device 58. An industry standard electronic form is completed by the provisioner 50 that includes the connecting facility assignment (CFA), the location of the access points for the business customer, service availability and a large amount of additional information. The CFA is a data structure that includes the facility type, facility designator and indicates the channels that are being requested. The location information indicates the location of the access point of the business customer to the LEC CO, on one side, and the location of the access point of the inter exchange carrier to the business customer at the local exchange carrier central office, on the other side. Provisioner 50 completes the electronic form that is sent to the automatic service request system (ASR) 60. The NDM system 62 is a batch program that runs periodically throughout the day, and collects all of the ASRs for a specific LEC. Periodically, the NDM system 62 then sends out all of the pending ASRs for a specific LEC. The NDM system is a commercially available system that complies with standard transfer protocols. The NDM system 62 defines an interface between the ASR 60 and LEC mainframe for placing orders with LECs. The NDM system provides a protocol that is designed to transfer data between the LEC mainframe and the ASR System 60. The NDM system 62 is commonly used in the industry for interfacing inter exchange carriers with LECs to send ASRs.

Once the ASR has been transmitted to the LEC mainframe, the LEC mainframe reviews the ASR electronic forms to verify the completeness and correctness of the ASR. The LEC mainframe then transmits an acknowledgment of the request. The acknowledgment may indicate that the order is correct and complete and has been accepted, or the acknowledgment may indicate any errors in the ASR. For example, the acknowledgment may indicate that there is an error in the CFA, or the location information. If the order is rejected, a supplemental order must be prepared and sent through the system in the same fashion.

For each original ASR order and for each supplemental ASR order, a fee must be paid by the inter exchange carrier 52. The provisioner 50 has placed the order with knowledge of what the provisioner thinks are correct CFAs, locations and service request information. Because of other orders going through the system and errors that may be made by the provisioner 50 in entering data in the electronic form in the interface device 58, supplemental orders may frequently be required. Typically, the facilities of each business customer are designated for each inter exchange carrier. In other words, inter exchange carriers are not normally competing for the same facilities. Hence, databases can be kept by the inter exchange carrier 52 to determine what facilities the inter exchange carrier thinks may be available. This avoids the necessity of the inter exchange carrier 52 contacting the LEC to determine the available facilities. Additionally, provisioners 50 typically have been isolated to single accounts. In this fashion, provisioners become familiar with what facilities are available and the location of those facilities for each business customer. However, errors can still frequently be made because of typos in entering the data and incorrect information that may have persisted for some time. For example, various systems may have been running for years and information may become lost or are inaccurate. An inter exchange carrier 52 may show that a particular connection was disconnected, while the LEC system still thinks that that connection is active. These types of problems have led to an increased need for a standard method of prevalidating orders.

There is a substantial cost incurred for rejected orders. The delays in the connection of the customer to the system may damage customer relationships between the inter exchange carrier and the business customer, and decrease revenues of the inter exchange carrier during the delay period. Further, the additional labor of the provisioners 50 in reentering data as supplemental orders is also costly to inter exchange carriers, as pointed out above.

Industry standards have been adopted for prevalidation systems to provide a standard way of prevalidating orders. Original standards were developed by the Order Billing Forum (OBF) which instituted the idea of a standardized prevalidation system. The T1M1 Committee of the OBF then adopted standards upon which the system of the present invention is based. The standard has essentially adopted a gateway-to-gateway interface between the LEC backend and the inter exchange carrier prevalidation system. The standard was written with the Common Object Request Broker Architecture (CORBA) as the communications standard for the gateways. CORBA allows disparate applications to communicate with one another. The T1M1 committee initially provided and defined the Interface Definition Language (IDL). The ORB is the middleware that establishes the client/server relationships between objects. Using an ORB, a client can transparently invoke a method on a server object, which can be on the same machine or across a network. The ORB intercepts the call, and is responsible for finding an object that can implement the request, passes the perameters, invoke its method and then return the results. The client does not have to be aware of where the object is located, its programming language, its operating system, or any other system aspects that are not part of the object's interface. In so doing, the ORB provides interoperability between applications on different machines in heterogeneously distributed environments, and seamlessly interconnects multiple object systems.

The standards, however, relate to a prevalidation system and not the ASR/NDM system. For these reasons, a prevalidation system incorporating these standards has typically been separate from the ASR/NDM system.

Figure 3:
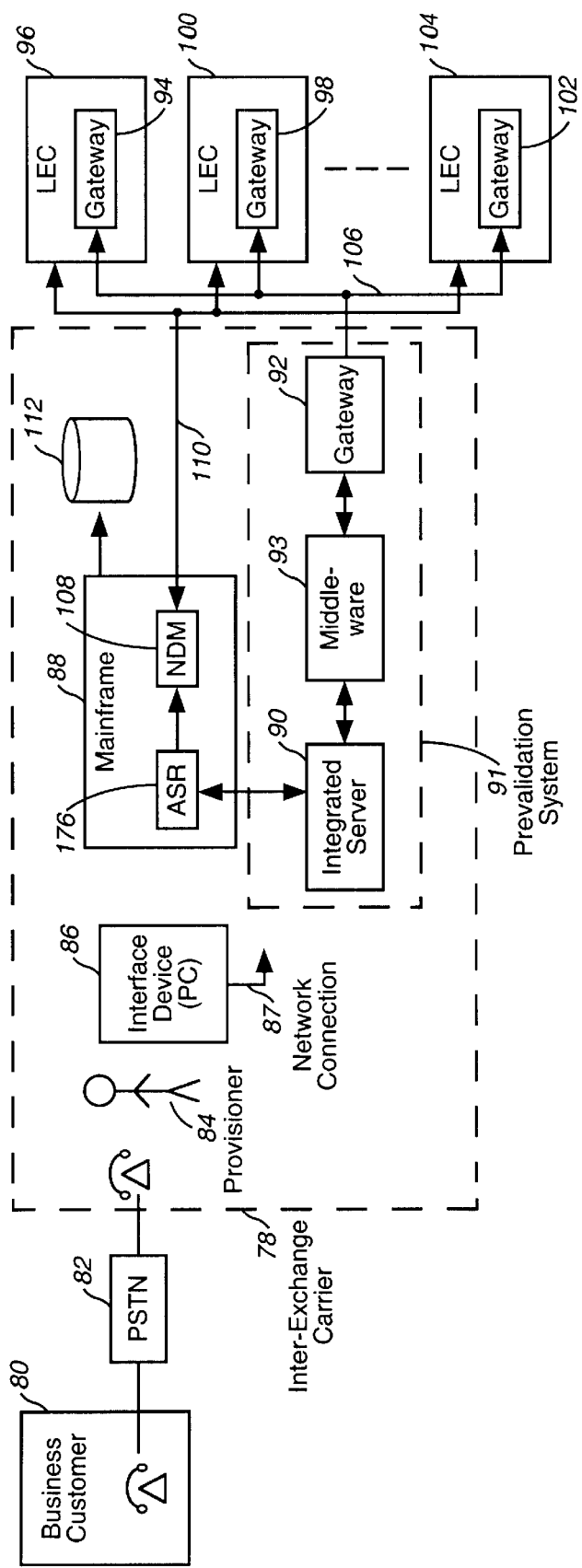
FIG. 3 is a schematic block diagram of the integrated system of the present invention.

FIG. 3 is a schematic illustration of a system that implements the present invention. The system illustrated in FIG. 3 integrates the mainframe ordering system of the inter exchange carrier 78 with a prevalidation system. In accordance with FIG. 3, a business customer 80 may place a telephone call via the public switch telephone network 82 to a provisioner 84 located at the inter exchange carrier premises 78. The business customer 80 may request additional services such as additional T1 services. The provisioner 84 can then enter the request in the interface device 86, such as personal computer that is connected to a network 87. The provisioner 84 can log onto the mainframe 88, or the prevalidation system 91, using the network connector 87. By logging onto the prevalidation system 91, stand alone prevalidation requests can be made to obtain provisioning information. By logging onto the mainframe 88, an integrated process of prevalidating orders and placing orders can be performed. This integrated process uses the prevalidation system 91 and employs the electronic forms of the ASR 176 to generate prevalidation requests. Actual orders are placed using ASR 176 and NDM 108, which is explained in more detail below. Prevalidation calls are placed from the mainframe 88 to the integrated server 90 of prevalidation system 91. These requests pass through middleware 93 that performs various functions described in more detail below. The requests are then passed to gateway 92 that transmits the requests to the appropriate LEC which may constitute LEC 96, 100, 104. The gateway communicates these requests to corresponding gateways 94, 98, 102. The requests are transmitted via secure T1 lines 106. Orders from the NDM 108 are placed through secure T1 lines 110 to the appropriate LEC. Gateway 92 and gateways 94, 98, and 102 employ the CORBA middleware that is able to transmit a prevalidation request to the gateways located at the LECs.

The prevalidation requests are followed by responses from the LEC that are transmitted from the LEC gateway-to-gateway 92 of the inter exchange carrier 78. These responses are then transmitted to the middleware 93 and integrated server 90, and back to the mainframe 88 and input device 86 where the provisioner 84 can view the response. Provisioner 84 can then use the data from the response, add further data that may be required to place the order, and then send the order on mainframe 88 as an access service request (ASR).

In operation, the provisioner 84 may complete different pages of the access service request upon receiving an order from a business customer 30. As each form of the ASR is completed, calls are automatically made through the integrated server 90, middleware 93 and gateway 92 to the appropriate gateway at the LEC. In this manner, data entered from the input device 86 is transmitted to the LEC as soon as it is sufficiently complete.

Once the ASR data is complete from the responses that are received by the prevalidation system, an ASR order may be placed through the NDM 108 via secured lines 110 to the appropriate LEC. The LEC then provides an acknowledgment of the ASR that either indicates that the ASR is complete and correct, or that it contains errors. Further, the LEC system is designed to indicate the type and location of the errors. All of this information is stored on storage device 112. If such errors are present, the provisioner 84 can make corrections to the ASR and resubmit the request as a supplemental request.

The system illustrated in FIG. 3 provides a capability of querying the backend systems of the LECs in real time for information that is relevant to (1) location, (2) service availability, and (3) connecting facility assignment (CFA). The preorder validation system significantly reduces the number of supplemental ASRs that are sent to the LECs to correct rejected data. In addition, the system illustrated in FIG. 3 provides critical provisioning information to the inter exchange carrier using the stand alone prevalidation requests. This information can then be used for future provisioning.

In that regard, the CFA information indicates the channels that exist within a leased facility that extend from the customer's actual control terminal location (ACTL) to a serving wire center (SWC), which is normally the LEC CO, as indicated in FIG. 1. The stand alone prevalidation process allows a provisioner to retrieve the status and relevant information from the LEC for specific channels, or a range of channels, of the CFA. The present application allows queries at the T1 through fiber levels.

FIGS. 4 through 9 illustrate various stand alone screens that can be accessed by the provisioner 84 using the input device 86. The integration process utilized in accordance with the present invention may incorporate data that is shown in these screens and place calls from the mainframe 88 to the LECs to automatically retrieve this data. However, FIGS. 4 through 9 also provide an indication of the type of requests that are made automatically using the integrated process of the present invention.

FIG. 4 is an illustration of a CFA inquiry. In this case, the provisioner may wish to determine the availability of channels in a CFA. As indicated in FIG. 4, a pull-down box 110 is used to select a particular LEC. For example, Southwestern Bell Corporation is shown in the pull-down box 110. The provisioner then inserts information in the CFA inquiry input section 112. Facility designators, as well as facility type and location A and location Z, are input by the provisioner 84. Additionally, channel information may be inserted, or the channel box may be left blank to determine the available channels. The provisioner is normally familiar with the facility designator input which constitutes the equipment ID on which the particular CFA inquiry is being made. The facility type is a particular type of service requested such as T1, T3, etc. Location A, as described above, is the location for the access of the inter exchange carrier in the local exchange central office. Location Z is the access point of the business customer to the local exchange carrier central office.

As also shown in FIG. 4, the prepopulate option box 114 allows the provisioner to enter NetPro circuits or NetPro order numbers (i.e., mainframe IDs) if the provisioner is familiar with that data, to obtain desired information. Once the information is entered, the send box 116 is activated and calls are placed through the system illustrated in FIG. 3 to the LEC backend. The requested information is then returned, as indicated on the output choices box 118. The status box indicates the status of the data. A "gateway sent" response indicates that the CFA inquiry has been sent through the gateway to the LEC and no response has yet been received. A "reply complete," which is not shown in the list, indicates that a reply has been received from the LEC backend and has been stored as part of the functions of the prevalidation system 91 that is shown in FIG. 3. The status "reply seen" indicates that the provisioner has accessed the database in the prevalidation system 91 (FIG. 3) and has retrieved the data for review. The LEC ID box indicates the particular LEC which, in this case is Southwestern Bell Corporation. The date box indicates the date and time of the action indicated in the status box. The ID box indicates the ID that has been assigned by the prevalidation system 91 (FIG. 3). The CFA box indicates the ID of the CFA that corresponds to the CFA inquiry input. Any of the rows of information shown in the output choices 118 can be double clicked to retrieve more detailed data.

Figure 5:
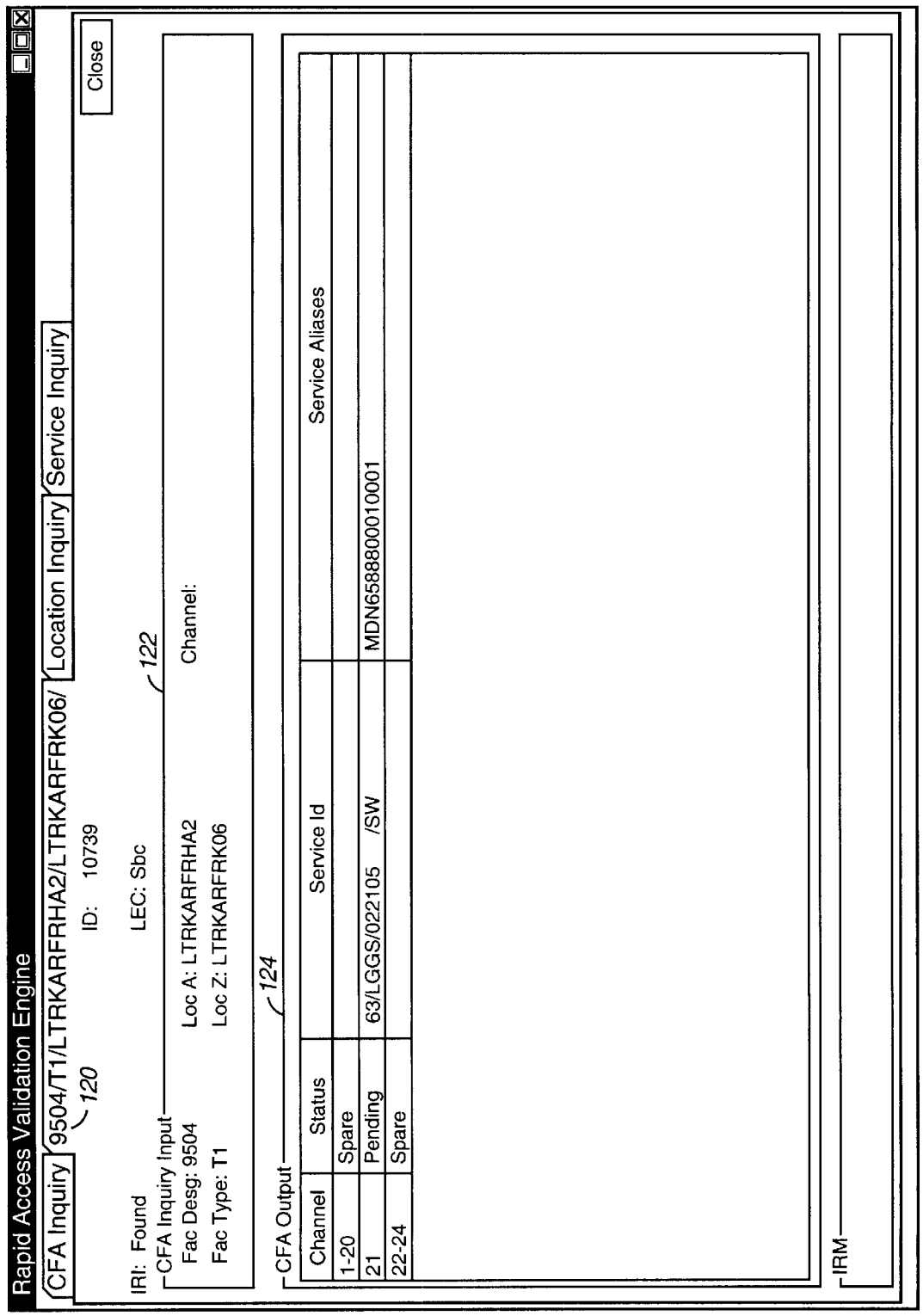
FIG. 5 is a screen printout of a response to a CFA inquiry.

FIG. 5 is a screen that indicates that the first row of information in the output choices box 118 of FIG. 4 has been double clicked to bring up additional information regarding that particular CFA. Of course, the status of the first line changed from "gateway sent" to "reply complete" prior to double clicking on the first row. As shown in FIG. 5, additional data is shown for the CFA that is indicated in the selection tab 120. The IRI indicates that the particular CFA that was being requested was found. The ID indicates the prevalidation system ID number that corresponds to the ID number of the first row of the output choices of FIG. 4. The LEC field identifies the LEC, which is Southwestern Bell Corporation. The CFA inquiry input box 122 indicates the particular data that was entered in the CFA inquiry input box 112 of FIG. 4. In other words, the CFA inquiry input box 122 is an indication of what was requested in box 112 of FIG. 4.

As also shown in FIG. 5, the CFA output 124 provides the response from the LEC as to which channels are available for the particular CFA that was requested. As shown in FIG. 5, channels 1 through 20 are available since the status indicates "spare." Channel 21 has a "pending" status which indicates that there is probably a connection order that is pending for that particular channel. CFA output 124 also indicates that channels 22 through 24 for that particular CFA T1 line are also available. Since the channel information was left blank in the CFA inquiry input 122, the full range of availability of channels is provided in the CFA output 124. This assists the provisioner in assigning channels for the ASR request when an order is placed.

FIG. 6 is a screen print of a location inquiry that has been made by the provisioner. In other words, the provisioner 84 (FIG. 3) is determining information relating to physical locations that are necessary for inclusion in the ASR request. FIGS. 6 and 7 provide the location information that may be required by the provisioner to complete the ASR request. As shown in FIG. 6, a drop down box is used to select the type of location inquiry to be made to the LEC. Drop down box 126 indicates that the information requested is a "descriptive address." Other options in the drop down address may include a numbered address, a unnumbered address, cilli codes, and ECCKT information (service ID). Drop down box 128 provides a selection for the particular LEC from which the information is being requested. The customer premises address box is the box in which the provisioner enters known information to obtain further location information. Since the "descriptive address" has been selected in box 126, the provisioner, in this example, has selected a building name which is "St. Louis Union Station." The provisioner also is aware of the postal code and that this building is located in Missouri. When other selections are made in the drop down box 126, other information can be included. For example, the name of the business customer may be included in the "CO. Name" box. The particular city in which the business customer is located can also be included. Alternatively, the provisioner can include ECCKT information in box 132. The provisioner may have particular ECCKT information for a desired location. The ECCKT information corresponds to a service ID, such as shown in box 124 of FIG. 5. Similarly, location code information can be entered in box 134 by the provisioner. The send box 136 can be activated by the provisioner to send a request through the system illustrated in FIG. 3 to the LEC backend.

The output choices box 138 of FIG. 6 shows a history of various calls that have been made to the LEC. The call corresponding to the information in the customer premises address box 130 is indicated on row 140 of the output choices box 138. As seen on row 140, a response has been returned as indicated in the status box of the output choices 138 on row 140 which indicates "reply seen". The LEC ID indicates the selected LEC and the date indicates the date and time of response. The ID number is the ID that is placed on the call by the prevalidation system 91. The data sent box indicates the customer premise address information 130 that was sent in accordance with the information entered in the customer premise address 130. By double clicking on row 140, the screen indicated in FIG. 7 is produced.

The screen illustrated in FIG. 7 indicates the specific data retrieved from the LEC for the "St. Louis Union Station" request. The customer premise address output box 144 indicates the detailed information regarding the St. Louis Union Station address. As indicated in box 144, a street name and address is provided, the floor location and room number are also provided that indicates the location of the particular equipment that has been searched. In other words, the information provided in box 144 indicates all the locations of all of the equipment at the St. Louis Union Station address.

Figure 8:
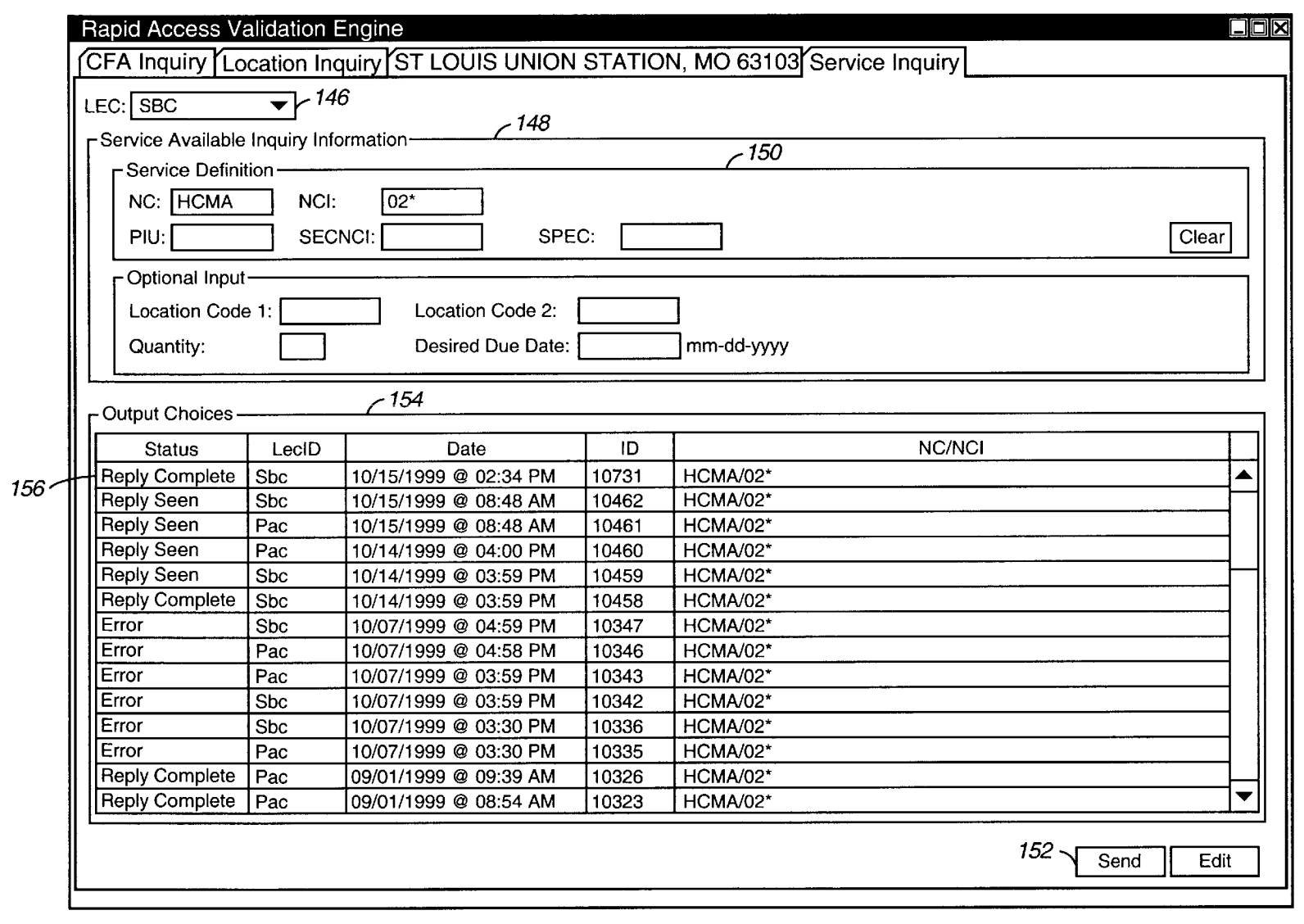

FIG. 8 illustrates a service inquiry screen. The drop down box 146 allows the provisioner to select a particular LEC for which the service inquiry is to be made. The "Service Available Inquiry Information" box 148 is a box in which the provisioner can enter information regarding service. As shown in FIG. 8, the service definition box 150 allows the provisioner to indicate the type of service that is being sought. As indicated in FIG. 8, an NC code of "HCMA" has been entered by the provisioner. This NC code is an equipment indicator. The NCI code of "02*" has been entered which constitutes a wildcard. Hence, all of the HCMA equipment will be provided by the LEC. The send box 152 is then activated by the provisioner. The output choices box 154 then indicates the status of the request. As indicated on row 156, the reply from the LEC has been received as indicated by the "reply completed" status signal. The LEC ID field indicates the appropriate LEC. The date field provides the date and time of the action indicated in the status box. The ID field constitutes the ID assigned by the prevalidation system 91. The NC/NCI field indicates the data that has been requested. By double clicking on line 156, the response is retrieved from storage in the prevalidation system 91 (FIG. 3) and the screen of FIG. 9 is produced.

Figure 9:
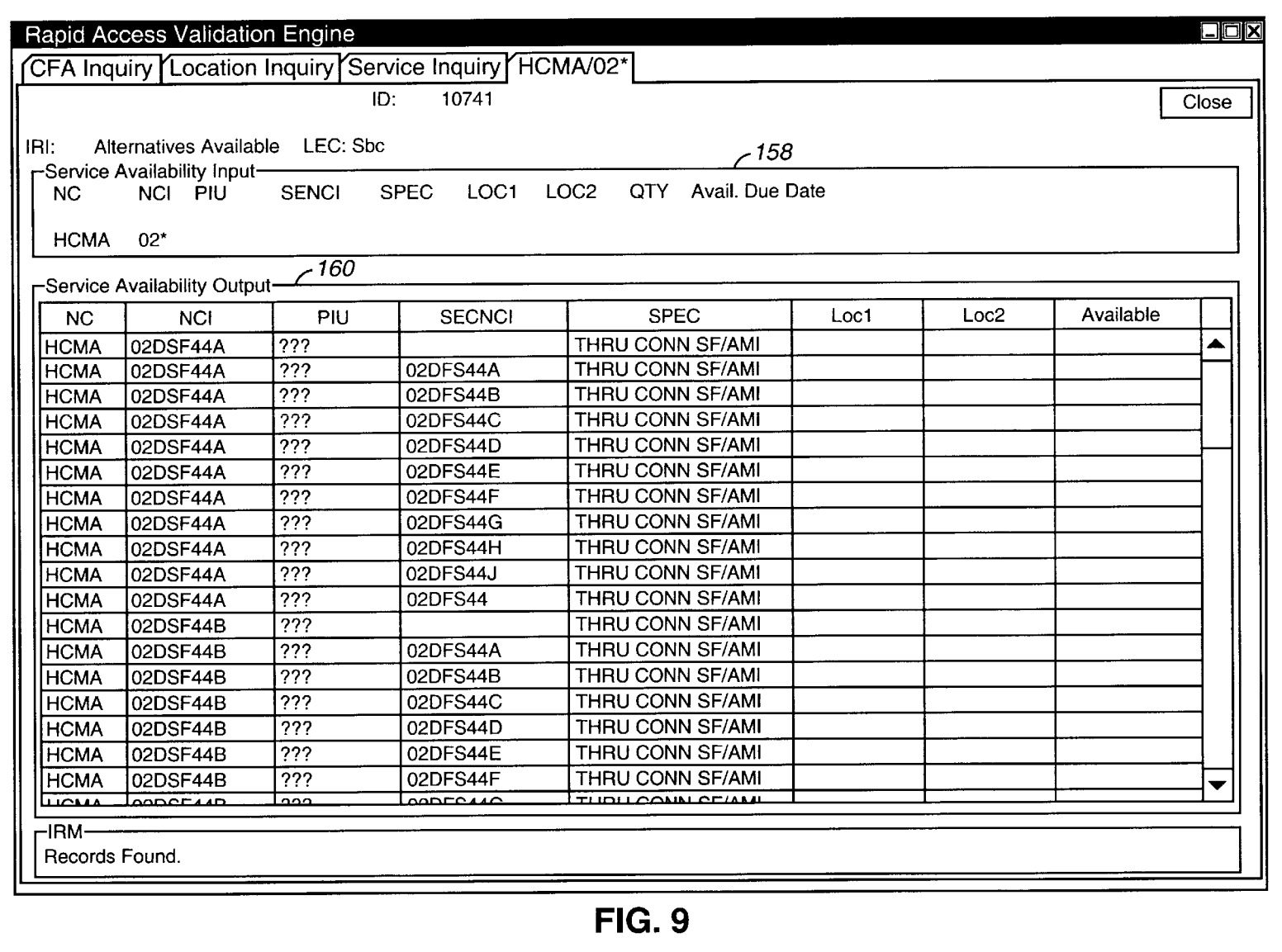

FIG. 9 is a screen printout of a particular service inquiry request. As indicated in FIG. 9, the service inquiry request has an ID number of 10741. The service availability input box 158 indicates the information that was requested by the provisioner in accordance with FIG. 8. As shown, an NC number of "HCMA" was requested and the wildcard "02*" was requested for the NCI input. The service availability output box 160 indicates all of the HCMA information. For example, all of the NCI identification numbers for the HCMA equipment are provided. Additionally, the secondary NCI equipment information is also listed in the NC/NCI field. Various specification information is listed in the "spec" field.

Figure 10:
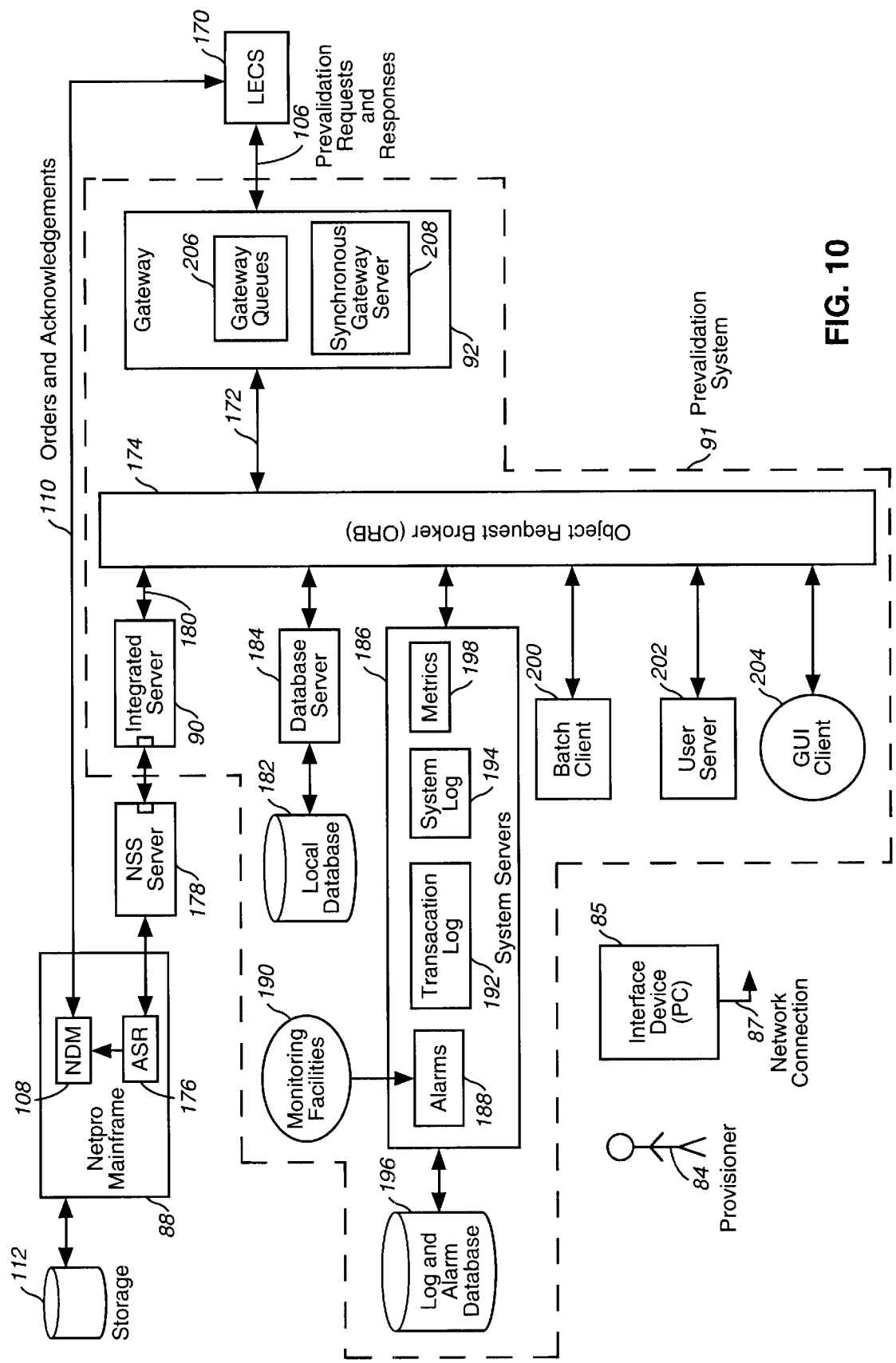
FIG. 10 is a more detailed block diagram of the integrated system of the present invention.

FIG. 10 is a schematic block diagram of the basic structure and functioning of the system of the present invention. As indicated in FIG. 10, the basic structure illustrated in FIG. 3 is shown with additional details. The provisioner 84 enters information on the interface device 86 which may be logged onto the NetPro mainframe 88 to perform an integrated process of prevalidation and ordering, or which may be logged onto GUI client 204 to perform stand alone prevalidation requests. The NetPro mainframe 88 is connected to a storage device 112 that archives information relating the requests, orders and acknowledgments that have been made by the NetPro mainframe 88. The NDM interface device 108 is connected to the secured line 110 that is connected to the backend systems of the LEC 170. Orders and acknowledgments are transmitted between the backend of the LEC 170 and the NDM interface device 108 via the secured line 110. Prevalidation requests and responses are synchronously transmitted between gateway 92 of the inter exchange carrier and a similar gateway of LEC 170 via secure line 106. Information from the gateway 92 is asynchronously communicated between the ORB 174 and gateway 92 via 172. Prevalidation requests and responses are transmitted between the ASR 176 and the NSS 178 synchronously. Similarly, prevalidation requests and responses are synchronously communicated between NSS 178 and the integrated server 90. The integrated server 90 asynchronously communicates with the ORB 174 of the prevalidation system 91 via connection 180.

The ORB 174 of FIG. 10 functions as an interface for various functions that are performed by the prevalidation system 91. For example, a local database 182 is connected through a database server 184 to the ORB 174. The ORB constitutes middleware that employs the CORBA software. The database server 184 and local database 182 constitute a local database. This database stores all of the transactions that are performed by the prevalidation system 91. The prevalidation system 91 relies upon the database server 184 and local database 182 for persistence so that if anything happens, the data has been stored in the local database 182. When a transaction is received by the prevalidation system 91, the first thing that occurs is that the transaction is stored to the database 182 so that it can be retrieved if there is a system problem. The database server 184 and local database 182 may also be used for auditing, as disclosed in more detail below.

Various system servers 186 also interface through the ORB 174, as illustrated in FIG. 10. For example, an alarm server 188 utilizes a standard third party tool called "Patrol" for its monitoring facilities 190. Monitoring facilities 190 may, for example, monitor the connection to the LEC. If the connection fails, then the monitoring facilities 190 instruct the alarm server to set an alarm. The systems servers 186 also includes a transaction log server 192 and a system log server 194. The transaction log server 192 logs each of the transactions that is placed through the prevalidation system 91 and stores this information in the log and alarm database 196. Similarly, the system log server 194 logs all of the system's activities in the log and alarm database 196. The alarm server 188 logs each of the alarms in the log and alarm database 196. The metric server 198 determines metrics for the operation of the system illustrated in FIG. 10, including response times of the LEC 170. These metrics are also stored in the log and alarm database 196. This metric information can be very useful in analyzing the abilities and limitations of the LEC backend systems. The metric system operates by making time stamps to determine how long it takes to process a prevalidation order through the prevalidation system 91. An accounting can be made of the location of delays that occur both in the prevalidating system 91 and at the LEC. For example, the prevalidation system 91 may have very high volume that requires a queuing of a number of calls which delays the system's operation. In this fashion, the determination can be made as to the apportionment of the delay period between the prevalidation system 91 and the LEC.

As also shown in FIG. 10, the batch client 200 is a client that operates in conjunction with the NetPro mainframe 88 and storage device 112 to provide reconciliation between the prevalidated responses and the ASR acknowledgments, as disclosed in more detail below. The user server 202 also interfaces with the ORB and functions as the interface for the prevalidation system 91. All of the external clients that access the prevalidation system 91 are processed by the user server 202. GUI client 204 is also processed by the user server 202 and provides a GUI interface for the stand alone inquiries that are made by the provisioner 84.

As indicated above, the prevalidation system 91 operates asynchronously. The gateway queues 206 of gateway 92 queue up the asynchronous responses transmitted by the prevalidation system 91 to the gateway 92. The synchronous gateway server 208 then interacts with the LEC 170 on a synchronous basis as indicated above. In this fashion, the asynchronous nature of the prevalidation system 91 can be maintained in an environment of synchronous communication with the LEC 170.

In operation, the provisioner 84 uses the interface device 85, such as a PC, that has a network connection 87. The network connection 87 allows a provisioner 84 to log on to either the NetPro mainframe 88 or into the prevalidation GUI client 204 to access the computing devices on which the prevalidation system 91 is operating. By logging directly into the GUI client 204 of ORB 174, the provisioner can utilize the GUI client 204 to make stand alone prevalidation requests, such as illustrated in FIGS. 4 through 9. When logging directly onto the NetPro mainframe 88, the provisioner accesses the ASR 176 process to generate access service requests. The access service request process is an integrated process that uses a series of electronic forms to generate access service requests. As each electronic form is completed, if the form contains prevalidated data, the ASR 176 automatically generates prevalidation requests which may include a number of calls for the current electronic form. Once the responses for the prevalidation request are received by the NetPro mainframe 88, an order is submitted through NDM 108 via secured line 110, as described above. In this fashion, an integrated process of prevalidation and ordering is provided in accordance with the present invention. The stand alone prevalidation requests that utilize GUI client 204 are used primarily by the provisioner 84 to obtain information regarding available channels, location information, and service inquiry information, as indicated above, with respect to FIGS. 4 through 9.

In the process of placing an order that uses the system illustrated in FIG. 10, the NetPro mainframe 88 utilizes NSS server 178 to interface with the integrated server 90. The integrated server 90 communicates with the ORB 174 using the CORBA middleware. However, integrated server 90 must communicate with the mainframe utilizing a communications protocol compatible with the NSS server 178. Although CORBA could be used on the NetPro mainframe 88 it is difficult and expensive to implement. The NSS server 178 is based on OS/2 server platforms and functions as a middleware client server architecture. The NSS server utilizes ABUs which are Atomic Business Units. As such, specific business logic runs on the NSS server 178. A module is created in the NSS server 178 to communicate with the integrated server 90 via a TCP/IP socket call. In operation, the NetPro mainframe 88 makes a call to the ABU of the NSS server 178, and the ABU uses a TCP/IP socket call to the integrated server 90. The integrated server makes a socket available via TCP/IP protocol. Integrated server 90 translates the data from the TCP/IP socket call into the CORBA structures that can be communicated through the ORB 174. The TCP/IP socket call provides data that is in the form of a flat delimited string. The integrated server 90 converts the flat delimited string of data into the CORBA data types. The integrated server 90 then makes a call into the prevalidation system 91. The integrated server 90 is also able to communicate with the ORB 174 an asynchronous manner, as indicated above. Hence, the integrated server is able to deal with the synchronous transmission of data from the NSS server 178 and provide data to the ORB 174 asynchronously. The integrated server 90 holds the socket connection to the mainframe open while the integrated server 90 collects the responses returned from the ORB 174. When the responses are received, the integrated server sends 90 the response to the mainframe 88. In this fashion, the mainframe 88 can operate synchronously while the integrated server 90 deals with the asynchronous aspects of the ORB system 174. It is important to note, however, that multiple inquiries can be made by the NSS server 178 into the integrated server 90 while each call is being held open. In this fashion, the NetPro mainframe 88 and the integrated server 90 can operate with parallel requests and responses. The integrated server 90 makes the multiple calls into the ORB 174 so that multiple calls may be transmitted through gateway 92 nearly simultaneously.

A reconciliation process can also be performed by the system illustrated in FIG. 10. As indicated previously, storage device 112 maintains all of the information regarding all of the orders and supplemental orders that are processed by the ASR system 176, as well as all of the acknowledgments that are received from the LEC 170. Various programs that are run by the NetPro mainframe 88 accumulate that data and generate a table of CFAs that are stored in storage 112. The table of CFAs indicates all of the CFAs that are utilized by the inter exchange carrier 78 (FIG. 3). In other words, the inter exchange carrier 78 keeps track of the status of each of the CFAs including the assignments of channels for each CFA.

The reconciliation process utilizes this table of CFAs to reconcile the inter exchange carrier CFA data with the LEC CFA data. Any differences between this data can then be reconciled with the LEC. This reconciliation process can be performed using the functions of the prevalidation system 91.

The prevalidation system 91 may periodically generate a query to the NetPro mainframe 88 to obtain the table of files that is stored in storage 112. These files are then FTP'd to the prevalidation system 91. The batch client 200 of the prevalidation system 91 then reads these files. FIG. 11 illustrates a sample table of a series of CFAs to 20. FIG. 11 is a sample of what may appear as a much more comprehensive table of files that is stored in storage device 112. As can be seen in FIG. 11, each CFA constitutes a separate row in FIG. 11 and includes the circuit identification information. CFAs are stored in the table as an ACSII file, as shown in FIG. 11.

As indicated above, the batch client 200 reads each of the CFAs line by line and generates prevalidation inquiries that are transmitted to the LEC in the manner described above. This occurs during slow periods, such as at night when prevalidation system 91 is not in use. Since the LECs do not charge for prevalidation inquiries, the only cost to the inter exchange carrier 78 is the cost of running the prevalidation system 91.

The LEC 170 provides responses in the manner described above. These responses are placed in a response file by the batch client 200. A typical response file is shown in FIG. 12. As indicated in FIG. 11, one of the CFAs is CFA 222. Referring to FIG. 12, the responses 224 from the prevalidation request for CFA 222 are provided. As shown in FIG. 12, channels 1, 2, and 3 are assigned. Channels 4 through 6 are spare channels that are available for assignment. Further, channels 8, 14, 16, 21, 22 and 24 are spare channels, while channels 7, 9 through 13, 15, 17 through 20 and 23 have been assigned.

As also shown in FIG. 11, one of the CFAs is CFA 226. FIG. 12 indicates the responses 228 for CFA 226 although not all of the responses are shown. The response reports which is shown in FIG. 12 are FTP'd back to the mainframe 88. The mainframe then generates reports that show the differences between the CFA data that is stored in storage device 112 and the response files that are shown in FIG. 12. The mainframe 88 generates reports that only show the differences between the response files of FIG. 12 and the CFA data that is stored in storage device 112. If differences exist, circuit IDs are compared with assigned purchase order numbers to provide additional information regarding the assignment of channels for the CFA. Additionally, circuit information may be used to provide additional evidence of the assignment of channels. In one implementation, a temporary database is generated by the NetPro mainframe 88 with the purchase order number associated with the CFA and the channel assignments. A comparison can then be run and if there are differences, a purchase order number can be used to determine where the problem has originated. This information can then be used by personnel at the inter exchange carrier to either adjust the inter exchange carrier database to correct a system error in the inter exchange carrier system or adjust the database of the LEC. Further, this information can be used to make billing corrections.

The invention illustrated in FIG. 10 can also perform auditing functions. As pointed out above, the system illustrated in FIG. 10 can operate as an integrated prevalidation and ordering system in which prevalidation requests and responses are automatically generated as each electronic form is completed when data is entered while placing an order. As indicated above, prevalidation responses can be received prior to submitting each service order. The NetPro mainframe 88 generates a file of these prevalidation responses and the resultant service order acknowledgments that are provided by LEC 170. Occasionally, an order will be prevalidated and an acknowledgment is returned that rejects the order. Since the prevalidation has occurred just previously to the placement of the order, the order should not have been rejected and the inter exchange carrier should not have to pay for a supplemental order. The file that is generated by the NetPro mainframe 88 includes each of the rejected acknowledgments and accepted prevalidation responses. Further, additional information may be provided such as purchase order numbers and other data fields such as the "Ver" field, the " Form ID" field, the "Field ID" field, the "Date and Time of Validation" field, the "Rave Request ID" field, the "Rave Response" field and the "User Action" field. Upon acknowledgment, the ASR system determines the field that is in error. The mainframe 88 then determines the corresponding response for this field from the database record. The ASR system then updates the file for this database pair with the error condition. This error condition can be used for reporting purposes. The mainframe 88 then generates a report that can be used for auditing costs that are incurred by the inter exchange carrier in generating a supplemental report. The report includes information as to the number of ASRs that were rejected because of a provisioner override of an error condition. It may also report the number of ASRs that were rejected even though the validation process was successful. The ASR system can post the response data for user review. Information in the report is useful to determine whether an action should be taken to call the LEC for explanation or to correct the ASR and resend the order. The report can be automatically generated and sent to the billing department for auditing purposes or to the LEC. The file, of course, can accumulate this data over a period of time and then forward the report to the accounting office on a periodic basis, such as once a week or once a month. In this fashion, the accounting office can provide evidence for refund of charges on supplemental orders.

Further, the NetPro mainframe 88 can store accepted prevalidation responses that are received as part of the integrated prevalidation and ordering process. In the process of generating prevalidation requests in the integrated prevalidation and ordering system, each of the prevalidation requests can be compared to prevalidation responses that have been previously accepted and stored in a file by mainframe 88. If the circuit identification and channels of a subsequent prevalidation request are the same as a previously accepted prevalidation response, a rejection signal can be generated by the NetPro mainframe 88 to prevent the submission of the service order. In other words, if the inter exchange carrier has already prevalidated an order, that order is reserved in the system so that there are not conflicts between orders.

Of course, information stored in the files by the mainframe for both the auditing and the prevalidation reservation processes includes information that must be provided by the prevalidation system 90. Queries may be made by the mainframe 88 to the prevalidation system 91. Specifically, these queries may be processed by the user server 202 which generates a database call to the database server 184 and local database 182. In this fashion, the data residing within the prevalidation system 91 can be provided to the mainframe 88 to provide the necessary data for the reconciliation files, the audit files and the prevalidation reservation files.

The present invention therefore provides a unique system that is capable of providing an integrated process for prevalidation and ordering, as well as providing for stand alone inquiries to obtain information from the LEC. The present invention is capable of providing a database of information that can be used by a provisioner to place orders and reconciling that database with the LEC database to ensure that proper information is provided. In this fashion, costs can be greatly reduced by avoiding the submission of supplemental orders that are based upon incorrect information. Further, savings can be provided by identifying incorrect data that is being used by the LEC.

The present invention is also capable of providing auditing information that can be used to audit charges that have been incurred by the inter exchange carrier as a result of a rejected acknowledgments that have followed accepted prevalidation responses in the integrated prevalidation and ordering system. Reports can be generated that can be used by the accounting department and sent directly to the LEC for resolution. Additionally, a prevalidation request can be reserved in the system illustrated in FIG. 10 by storing a record of each prevalidation response that has been accepted and comparing them with each subsequent prevalidation request. In this fashion, conflicting requests that are made at nearly the same time do not result in any overlap and will avoid submission of conflicting orders.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

We claim:

1. A method of auditing an integrated prevalidation and ordering system in which service orders are placed by an inter exchange carrier with a local exchange carrier comprising:

obtaining prevalidation responses and service order acknowledgments in response to generation of one or more service orders on said integrated prevalidation and ordering system;

generating a file of said prevalidation responses and service order acknowledgments for each service order that has a rejected acknowledgment and an accepted prevalidation response; and using said file to audit charges incurred by said inter exchange carrier for said service orders.

2. The method of claim 1 further comprising:

storing said accepted prevalidation responses;

comparing each subsequent prevalidation request with said accepted prevalidation responses;

generating a rejection signal whenever said subsequent prevalidation request includes circuit channels that have corresponded to circuit channels of said accepted prevalidation responses;

preventing submission of said service order upon receipt of said rejection signal.

3. The method of claim 1 wherein said step of obtaining prevalidation responses comprises:

completing a plurality of electronic forms in said process of placing said service orders that provide data relating to said service order;

prevalidating said data provided on each electronic form of said plurality of electronic forms as soon as said electronic form is completed.

4. The method of claim 1 wherein said step of generating a file further comprises:

attaching purchase order numbers to said service order acknowledgments and said prevalidation responses to assist in auditing charges incurred by said inter exchange carrier.

5. A system for auditing charges incurred by an inter exchange carrier for supplemental orders necessitated by rejected acknowledgments of one or more service orders that received an accepted prevalidation response comprising:

a prevalidation system that generates prevalidation requests and receives prevalidation responses in response to preparation of a service order in an integrated prevalidation and ordering system; and an ordering system connected to said prevalidation system and a local exchange carrier that generates a file of accepted prevalidation responses and rejected service order acknowledgments, and generates a report from said file to audit said charges incurred by said inter exchange carrier.

6. The system of claim 5 wherein said ordering system further comprises:

a storage device for storing said files.

7. The system of claim 5 wherein said prevalidation system further comprises:

an object request broker that is coupled to said ordering system;

a gateway that is coupled to said object request broker and another gateway utilized by said local exchange carrier.

8. The system of claim 5 wherein said prevalidation system further comprises:

a metric system that is capable of generating metric information regarding operation of said prevalidation system and said ordering system.

9. The system at claim 5 wherein said ordering system further comprises:

ordering system software for interfacing with said local exchange carrier to place orders;

translation software that enables communication between said ordering system and said prevalidation system.

10. A method of auditing service orders placed by an inter exchange carrier with a local exchange carrier, comprising:

sending prevalidation requests for associated service orders to the local exchange carrier;

receiving prevalidation responses from the local exchange carrier in response to the prevalidation requests;

sending the associated service orders to the local exchange carrier based on the prevalidation responses;

receiving service order acknowledgments from the local exchange carrier in response to the associated service orders; and determining a set of service orders whose service order acknowledgments include rejections and whose prevalidation responses include validations.

11. The method of claim 10, further comprising:

auditing charges from the local exchange carrier associated with the set of service orders.

12. The method of claim 10, further comprising:

determining which service orders in the set of service orders should be corrected and resent to the local exchange carrier.

13. The method of claim 10, further comprising:

storing prevalidation responses from the local exchange carrier that include validations;

comparing subsequent prevalidation requests with the stored prevalidation responses; and preventing transmission of a service order associated with a subsequent prevalidation request that includes a resource in the stored prevalidation responses.

* * * * *